United States Patent
Kohn et al.

(10) Patent No.: US 11,713,730 B2
(45) Date of Patent: Aug. 1, 2023

(54) CONVERGENT-DIVERGENT FLAP PAIR FOR A VARIABLE-GEOMETRY TURBOJET ENGINE NOZZLE COMPRISING COOLING AIR CIRCULATION DUCTS CONNECTED THROUGH CONTACT SURFACES

(71) Applicant: SAFRAN AIRCRAFT ENGINES, Paris (FR)

(72) Inventors: Thierry Kohn, Moissy-Cramayel (FR); Frédéric Paul Eichstädt, Moissy-Cramayel (FR); Florent Luc Lacombe, Moissy-Cramayel (FR); François Leglaye, Moissy-Cramayel (FR); Brice Marie Yves Emile Le Pannerer, Moissy-Cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 0 days.

(21) Appl. No.: 17/753,220

(22) PCT Filed: Aug. 27, 2020

(86) PCT No.: PCT/FR2020/051505
§ 371 (c)(1),
(2) Date: Feb. 24, 2022

(87) PCT Pub. No.: WO2021/038172
PCT Pub. Date: Mar. 4, 2021

(65) Prior Publication Data
US 2022/0290631 A1 Sep. 15, 2022

(30) Foreign Application Priority Data
Aug. 30, 2019 (FR) ...................... 1909540

(51) Int. Cl.
*F02K 1/12* (2006.01)
*F02K 1/80* (2006.01)
(Continued)

(52) U.S. Cl.
CPC .............. *F02K 1/1223* (2013.01); *F02C 7/18* (2013.01); *F02K 1/1292* (2013.01); *F02K 1/80* (2013.01);
(Continued)

(58) Field of Classification Search
CPC ........ F02K 1/1223; F02K 1/1292; F02K 1/80; F16L 27/0849; F16L 27/0853; F16L 27/087; F16L 27/093
See application file for complete search history.

(56) References Cited

U.S. PATENT DOCUMENTS 3,387,788 A * 6/1968 David ........................ F02K 1/08
239/265.39
4,081,137 A * 3/1978 Sutton ........................ F02K 1/12
239/127.3
(Continued)

FOREIGN PATENT DOCUMENTS

| GB | 892289 A | * | 3/1962 | |
| GB | 2235728 A | * | 3/1991 | ............... F02K 1/12 |
| GB | 2235728 A | | 3/1991 | |

OTHER PUBLICATIONS

Search Report issued in French Patent Application No. 1909540 dated Jul. 6, 2020.
(Continued)

*Primary Examiner* — Todd E Manahan
*Assistant Examiner* — Marc J Amar
(74) *Attorney, Agent, or Firm* — Pearne & Gordon LLP

(57) ABSTRACT

In a convergent-divergent flap pair for a turbojet engine nozzle of the variable-geometry convergent-divergent type,
(Continued)

the convergent flap and the divergent flap include respective cooling-air ducts connected to one another through air passage openings formed in respective contact surfaces of the convergent flap and of the divergent flap arranged facing one another.

9 Claims, 4 Drawing Sheets

(51) Int. Cl.
      *F02K 1/82*       (2006.01)
      *F02C 7/18*       (2006.01)

(52) U.S. Cl.
      CPC ........ *F02K 1/822* (2013.01); *F05D 2250/323* (2013.01); *F05D 2250/324* (2013.01); *F05D 2260/202* (2013.01)

(56) References Cited

U.S. PATENT DOCUMENTS

| | | | |
|---|---|---|---|
| 5,101,624 A * | 4/1992 | Nash | F02K 1/805 239/127.1 |
| 5,111,550 A | 5/1992 | LeBlanc | |
| 5,255,849 A * | 10/1993 | Mayer | F02K 1/822 239/127.3 |
| 5,720,434 A * | 2/1998 | Vdoviak | F02K 1/822 239/127.1 |
| 5,775,589 A * | 7/1998 | Vdoviak | F02K 1/12 239/127.3 |
| 5,799,874 A * | 9/1998 | Eigenbrode | F02K 1/36 239/265.17 |
| 6,301,877 B1 * | 10/2001 | Liang | F02K 1/822 239/127.3 |
| 9,932,845 B2 * | 4/2018 | Cowan | F02K 1/1223 |
| 2005/0091964 A1 * | 5/2005 | Curtelin | F02K 1/822 60/262 |
| 2022/0275771 A1 * | 9/2022 | Leglaye | F02K 1/1223 |

OTHER PUBLICATIONS

International Search Report for issued in Application No. PCT/FR2020/051505 dated Nov. 26, 2020.
Written Opinion for PCT/FR2020/051505 dated Nov. 26, 2020.

* cited by examiner

CONVERGENT-DIVERGENT FLAP PAIR FOR A VARIABLE-GEOMETRY TURBOJET ENGINE NOZZLE COMPRISING COOLING AIR CIRCULATION DUCTS CONNECTED THROUGH CONTACT SURFACES

This is the National Stage of PCT international application PCT/FR2020/051505, filed on Aug. 27, 2020 entitled "CONVERGENT-DIVERGENT FLAP PAIR FOR A VARIABLE-GEOMETRY TURBOJET ENGINE NOZZLE COMPRISING COOLING AIR CIRCULATION DUCTS CONNECTED THROUGH CONTACT SURFACES", which claims the priority of French Patent Application No. 1909540 filed Aug. 30, 2019, both of which are incorporated herein by reference in their entireties.

TECHNICAL FIELD

The present invention relates to the field of the turbojet engines intended for the propulsion of the aircraft capable of supersonic flight, and relates more particularly to a convergent-divergent flap pair for a turbojet engine nozzle of the variable-geometry convergent-divergent type, a nozzle equipped with such a convergent-divergent flap pair, and a turbojet engine comprising such a nozzle.

PRIOR ART

The turbojet engines intended for supersonic flight comprise in general a reheat channel, the outlet of which is defined by an axisymmetric nozzle of the convergent-divergent type, in order to allow the acceleration of the flow of air exiting the reactor to speeds greater than Mach 1.

To be efficient at the various speeds at which a supersonic aircraft is capable of flying, such a nozzle has a variable geometry, allowing to vary the inner cross-section of the nozzle and in particular the position and the shape of the throat of the nozzle.

For this purpose, such a nozzle includes a set of mobile inner flaps intended to channel the flow of gas exiting the reactor, this assembly comprising an annular row of convergent flaps followed by an annular row of divergent flaps. The divergent flaps are in general articulated at their respective upstream ends on respective downstream ends of the convergent flaps, and the convergent flaps themselves are articulated at their respective upstream ends on a stator structure of the turbojet engine. The set of mobile inner flaps thus consists of an annular row of convergent-divergent flap pairs.

Such a nozzle further includes an annular row of mobile outer flaps surrounding the set of mobile inner flaps.

Given the high temperature of the gases at the outlet of a reheat channel, it is desirable to ensure a cooling of the inner flaps of such a nozzle in order to guarantee their mechanical endurance.

For this purpose, cooling air must be taken from the working flow of air of the turbojet engine, this is why it is desirable to limit the quantity of air necessary for the cooling in order to optimise the propulsion performance of the reactor.

Such a goal contradicts, however, the desire to increase the richness of the reheat gases to improve the propulsion performance of the turbojet engines, because such an increase in richness involves an increase in temperature of the gases, and thus an increase in the need for cooling.

DISCLOSURE OF THE INVENTION

The goal of the invention is in particular to at least partially solve the above problem, and in particular to propose an effective solution for cooling of the mobile inner flaps of a variable-geometry convergent-divergent turbojet engine nozzle, while limiting the negative impact of such cooling on the propulsion performance of the turbojet engine.

For this purpose, the invention proposes a convergent-divergent flap pair for a turbojet engine nozzle of the variable-geometry convergent-divergent type, comprising a convergent flap, and a divergent flap mounted pivotably on the convergent flap about a pivot axis, whereby the convergent-divergent flap pair is capable of going from a first extreme angular configuration, in which the convergent flap and the divergent flap make between them a maximum salient angle, to a second extreme angular configuration, in which the convergent flap and the divergent flap make between them a minimum salient angle smaller than the maximum salient angle, wherein the convergent flap includes a respective inner wall, having a respective inner surface for channelling combustion gas and a respective outer surface, and a respective outer wall, wherein the convergent flap includes a respective cooling air circulation duct defined between the respective outer surface of the respective inner wall of the convergent flap and the respective outer wall of the convergent flap, wherein the divergent flap includes a respective inner wall and a respective outer wall, wherein the divergent flap includes a respective cooling air circulation duct defined between the respective outer surface of the respective inner wall of the divergent flap and the respective outer wall of the divergent flap, wherein the convergent flap includes a convergent-flap contact surface in the shape of a cylinder portion, the axis of curvature of which is the pivot axis, and provided with first air passage openings opening into the respective cooling air circulation duct of the convergent flap, wherein the divergent flap includes a divergent-flap contact surface in the shape of a cylinder portion, the axis of curvature of which is the pivot axis, and provided with second air passage openings opening into the respective cooling-air duct of the divergent flap, wherein the divergent-flap contact surface is arranged directly opposite the convergent-flap contact surface, so that the divergent-flap contact surface slides along the convergent-flap contact surface when the divergent flap pivots with respect to the convergent flap, wherein the first air passage openings and the second air passage openings are shaped and positioned so that the first air passage openings are arranged directly opposite the second air passage openings, respectively, and thus place in communication the respective cooling air circulation duct of the convergent flap and the respective cooling-air duct of the divergent flap, regardless of the angular configuration adopted by the convergent-divergent flap pair.

The invention thus allows efficient cooling of mobile inner flaps, only requiring a moderate quantity of air, and thus having a moderate impact on the performance of a turbojet engine equipped with such a nozzle.

The invention thus allows to improve the mechanical endurance of mobile inner flaps and to control the thermal behaviour of the latter.

The invention further allows to limit the temperature of such a nozzle, and thus to limit the infrared signal thereof.

The limitation of the temperature of the nozzle further allows the use of a broader choice of materials in the latter, in particular materials for electromagnetic absorption that are in general not very tolerant with regard to high temperatures.

In a preferred embodiment of the invention, a first duct, out of the respective cooling air circulation duct of the convergent flap and the respective cooling-air duct of the divergent flap, is interposed between the pivot axis and a corresponding surface out of the convergent-flap contact surface and the divergent-flap contact surface.

Preferably, the respective inner wall of the one out of the convergent flap and the divergent flap that includes said first duct has a curved end portion on which said corresponding surface is formed and including those out of the first air passage openings and the second air passage openings which belong to said corresponding surface.

Preferably, the one out of the convergent flap and the divergent flap that includes the other duct out of the respective cooling air circulation duct of the convergent flap and the respective cooling-air duct of the divergent flap includes a respective closing wall, on which the other surface, out of the convergent-flap contact surface and the divergent-flap contact surface, is formed, said closing wall including those out of the first air passage openings and the second air passage openings which belong to said other surface, and said closing wall mutually connecting two respective ends of the inner wall and of the outer wall of the flap.

Preferably, said first duct is the respective cooling-air duct of the divergent flap.

Preferably, the convergent flap includes two lateral-end walls each connecting the respective inner wall of the convergent flap to the respective outer wall of the convergent flap, so that the respective cooling air circulation duct of the convergent flap is further defined by the respective lateral-end walls of the convergent flap.

Preferably, the divergent flap includes two lateral-end walls each connecting the respective inner wall of the divergent flap to the respective outer wall of the divergent flap, so that the respective cooling-air duct of the divergent flap is further defined by the respective lateral-end walls of the divergent flap.

Preferably, the respective inner wall of the divergent flap has a respective inner surface for channelling combustion gas and a respective outer surface, and wherein the respective cooling-air duct of the divergent flap is a cooling air circulation duct defined by the respective outer surface of the respective inner wall of the divergent flap.

The invention also relates to a nozzle of the variable-geometry convergent-divergent type for a turbojet engine, comprising convergent-divergent flap pairs distributed around an axis of the nozzle and at least some of which are convergent-divergent flap pairs of the type described above, and a channel for circulation of combustion gas defined at least by the respective inner surfaces for channelling combustion gas of the respective convergent flaps and of the respective divergent flaps of the convergent-divergent flap pairs.

The invention also relates to a turbojet engine for an aircraft, comprising a reheat channel surrounded by a cooling plenum separated from the reheat channel by a thermal protection liner, and a nozzle of the type described above, wherein the respective cooling air circulation ducts of the convergent flaps of the convergent-divergent flap pairs of the type described above of the nozzle are connected to the cooling plenum surrounding the reheat channel.

BRIEF DESCRIPTION OF THE DRAWINGS

The invention will be better understood, and other details, advantages and features thereof will appear upon reading the following description made as a non-limiting example and in reference to the appended drawings in which.

In all of these drawings, identical references can designate identical or analogous elements.

DETAILED DISCLOSURE OF PREFERRED EMBODIMENTS

Figure 1:
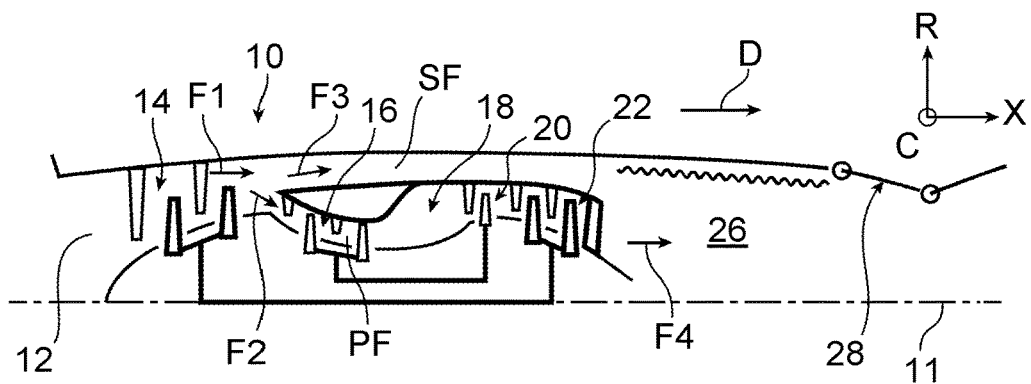
FIG. 1 is a schematic half view of an axial cross-section of a turbojet engine comprising a nozzle of the variable-geometry convergent-divergent type, arranged at the outlet of a reheat channel.

FIG. 1 illustrates a turbojet engine 10, for example a two-spool turbofan, intended for the propulsion of an aircraft capable of supersonic flight, and thus intended in particular to be installed in the fuselage of such an aircraft.

Throughout this description, the axial direction X is the direction of the longitudinal axis 11 of the turbojet engine. Except when it is stipulated otherwise, the radial direction R is in all points a direction orthogonal to the longitudinal axis 11 and passing through the latter, and the circumferential direction C is in all points a direction orthogonal to the radial direction R and to the longitudinal axis 11. Except when it is stipulated otherwise, the terms "inner" and "outer" respectively refer to a relative proximity, and a relative distance, of an element with respect to the longitudinal axis 11. Finally, the adjectives "upstream" and "downstream" are defined in reference to a general direction D of the flow of the gases in the turbojet engine 10.

Such a turbojet engine 10 comprises, for illustrative purposes, from upstream to downstream, an air inlet 12, a low-pressure compressor 14, a high-pressure compressor 16, a combustion chamber 18, a high-pressure turbine 20, a low-pressure turbine 22, a reheat channel 26, and a nozzle 28 of the variable-geometry convergent-divergent type. These members of the turbojet engine are all centred according to the longitudinal axis 11 of the turbojet engine.

In a well-known manner, the high-pressure compressor 16, the combustion chamber 18, and the high-pressure 20 and low-pressure 22 turbines define a primary jet PF. The latter is surrounded by a bypass jet SF of the turbomachine that extends from upstream to downstream from an outlet of the low-pressure compressor. Thus, during operation, air F1 that entered through the air inlet 12 and that was compressed by the low-pressure compressor 14 is then divided into a primary flow F2 that circulates in the primary jet and a bypass flow F3 that circulates in the bypass jet 30. The primary flow F2 is thus compressed even more in the high-pressure compressor 16, then mixed with fuel and ignited in the combustion chamber 18, before undergoing an expansion in the high-pressure turbine 20 then in the low-pressure turbine 22.

The flow of gas F4, consisting of the mixture of the combustion gases, coming from the primary jet, and of the bypass flow F3, then circulates in the reheat channel 26, then escapes from the turbojet engine 10 through the nozzle 28.

In an operating mode with reheat, for example to propel an aircraft at supersonic speeds, fuel is mixed with the flow of gas F4 in the reheat channel 26, and the mixture thus formed is ignited inside this reheat channel, in order to generate additional thrust. The convergent-divergent configuration of the nozzle 28 thus allows to accelerate the flow of gas F4 to supersonic speeds.

Figure 2:
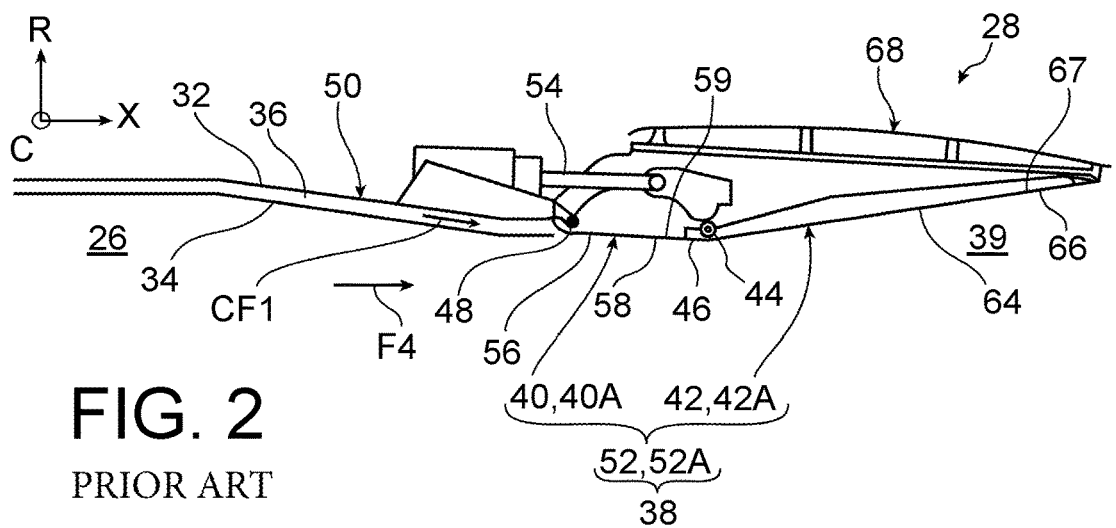
FIG. 2 is a schematic half view of an axial cross-section of a reheat channel and of a nozzle of the variable-geometry convergent-divergent type of a known type.

FIG. 2 illustrates on a larger scale the reheat channel 26, and the nozzle 28, in a configuration known from the prior art.

The reheat channel 26 includes an outer envelope 32 having a shape of revolution, and a thermal protection liner 34 extending coaxially to the outer envelope 32 inside the latter. The outer envelope 32 and the thermal protection liner 34 define between them a cooling plenum 36 intended for the circulation of a flow of cooling air CF1 along the outer envelope 32.

The nozzle 28 includes a set 38 of mobile inner flaps defining on the outside a channel for circulation of combustion gas 39, which corresponds, in the turbojet engine, to a downstream end part of the reheat channel 26. The mobile inner flaps thus allow to channel the flow of gas F4 at the outlet of the turbojet engine 10 during operation.

The set 38 of mobile inner flaps comprises, upstream, an annular row of convergent flaps 40, followed, downstream, by an annular row of divergent flaps 42.

The divergent flaps 42 are articulated, at their respective upstream ends 44, respectively on respective downstream ends 46 of the convergent flaps 40. The convergent flaps 40 are themselves articulated at their respective upstream ends 48 on a stator structure 50 of the turbojet engine.

The set 38 of mobile inner flaps thus consists of an annular row of convergent-divergent flap pairs 52, the flaps of each pair being articulated to be capable of going from a first extreme angular configuration, in which the convergent flap and the divergent flap make between them a maximum salient angle, to a second extreme angular configuration, in which the convergent flap and the divergent flap make between them a minimum salient angle smaller than the maximum salient angle, and vice versa, in a manner known per se.

Figure 3:
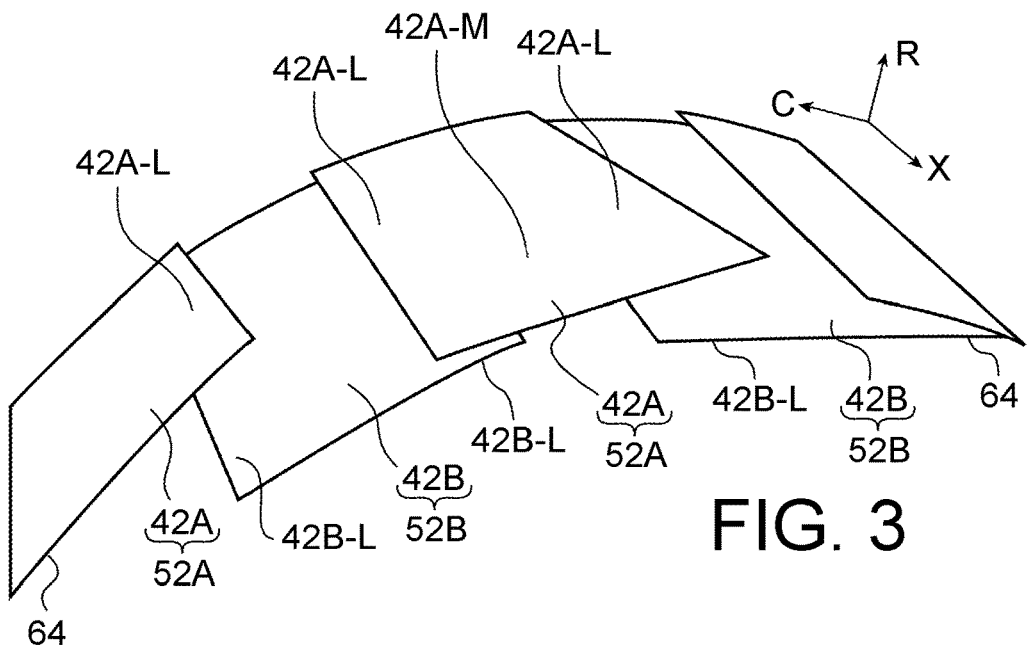
FIG. 3 is a partial schematic perspective view of an annular row of divergent flaps that are part of the nozzle of FIG. 2.

For example, the set 38 includes controlled convergent-divergent flap pairs 52A, and follower convergent-divergent flap pairs 52B, disposed in alternation in the circumferential direction C. The controlled convergent-divergent flap pairs 52A consist of controlled convergent flaps 40A and of controlled divergent flaps 42A, while the follower convergent-divergent flap pairs 52B consist of follower convergent flaps 40B and of follower divergent flaps 42B. FIG. 3 shows respective divergent flaps 42A, 42B of controlled pairs 5A and of follower pairs 52B.

The controlled pairs 52A, one of which is visible in FIG. 2, are directly connected to respective actuation members 54 of the nozzle, which actuation members are mounted on the stator structure 50 of the turbojet engine, in such a way as to directly control the movement of the controlled pairs 52A.

The follower pairs 52B cooperate with the adjacent controlled pairs 52A via drive members (not visible in the drawings) configured to communicate a movement of the controlled pairs 52A to the follower pairs 52B.

The convergent flaps 40 each include a respective wall for channelling combustion gas 56, extending according to a respective longitudinal direction of the flap, and having, on a radially inner side, a respective inner surface for channelling combustion gas 58 and, on a radially outer side, a respective outer surface 59.

The divergent flaps 42 each include a respective wall for channelling combustion gas 64, extending according to a respective longitudinal direction of the flap, and having, on a radially inner side, a respective inner surface for channelling combustion gas 66 and, on a radially outer side, a respective outer surface 67.

The respective inner surfaces for channelling combustion gas 58 and 66 of the convergent flaps 40 and of the divergent flaps 42 define the channel for circulation of combustion gas 39, and thus allow to channel the flow of gas F4 at the outlet of the turbojet engine 10.

The nozzle 28 further includes an annular row of mobile outer flaps 68 surrounding the set 38 of mobile inner flaps (FIG. 2) and articulated on the stator structure 50 of the turbojet engine in such a way as to move in a manner synchronised with the set 38 of mobile inner flaps.

During operation, the cooling air coming from the cooling plenum 36 escapes freely towards downstream and towards the sides after having contributed to the cooling of the outer envelope 32, and optionally contributes in a marginal manner to the cooling of the set 38 of mobile inner flaps.

The invention, a preferred embodiment of which will now be described in reference to FIGS. 4 to 7, proposes an improvement of the nozzle 28 of the variable-geometry convergent-divergent type. More precisely, the invention allows an improvement of the cooling of the set 38 of mobile inner flaps, as will appear more clearly below.

Figure 4:
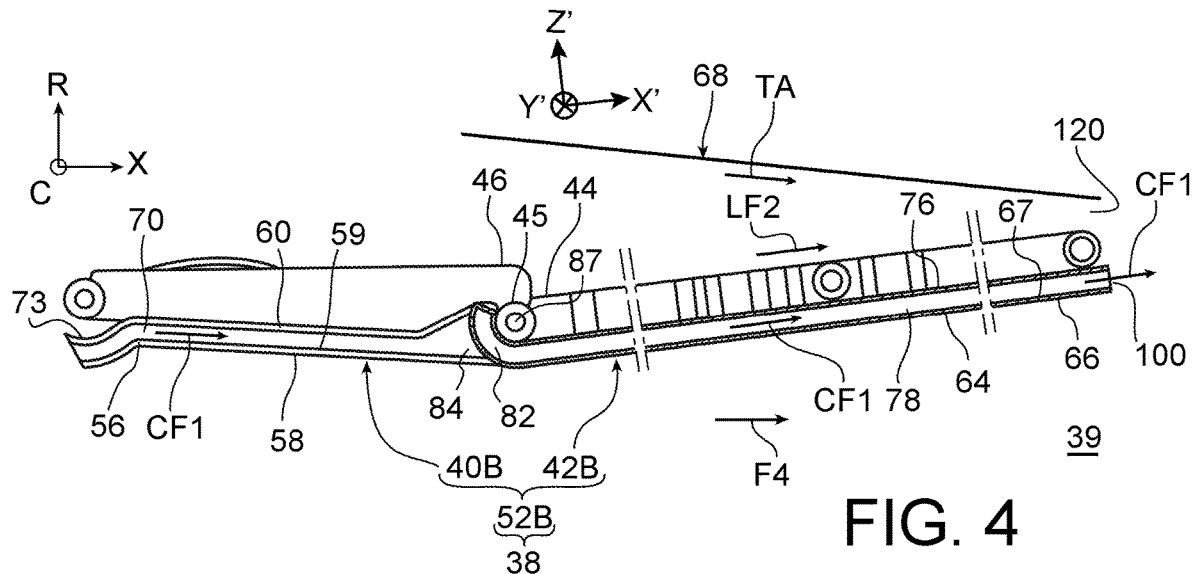
FIG. 4 is a partial schematic view of an axial cross-section of the nozzle of the variable-geometry convergent-divergent type of the turbojet engine of FIG. 1, comprising convergent-divergent flap pairs according to a preferred embodiment of the invention, one of which is visible in a first configuration.

FIG. 4 shows more particularly a follower convergent-divergent flap pair 52B, as well as, disposed radially opposite the latter, a mobile outer flap 68, illustrated very schematically. The explanations given below in reference to FIGS. 4 to 7 are valid for each of the follower convergent-divergent flap pairs 52B of the nozzle 28.

The follower convergent-divergent flap pair 52B, also visible in FIGS. 5A to 7, comprises a convergent flap 40B and a divergent flap 42B.

As explained above, the divergent flap 42B is articulated at its upstream end 44 on the downstream end 46 of the convergent flap 40B, for example via a hinge articulation 45, whereby the follower convergent-divergent flap pair 52B is capable of going from a first extreme angular configuration (FIG. 5A), in which the convergent flap 40B and the divergent flap 42B make between them a maximum salient angle, to a second extreme angular configuration (FIG. 5B), in which the convergent flap 40B and the divergent flap 42B make between them a minimum salient angle smaller than the maximum salient angle.

In a manner analogous to that which is described above, the convergent flap 40B includes a respective wall for channelling combustion gas, called inner wall 56 below, extending according to a respective longitudinal direction of the flap, and having, on a radially inner side, a respective inner surface for channelling combustion gas 58 and, on a radially outer side, a respective outer surface 59.

Unlike the above, the convergent flap 40B includes a respective outer wall 60, extending opposite the outer surface 59 of the inner wall 56 of this flap (FIGS. 4, 5A-5B and 7), for example in parallel to the inner wall 56.

Figure 6:
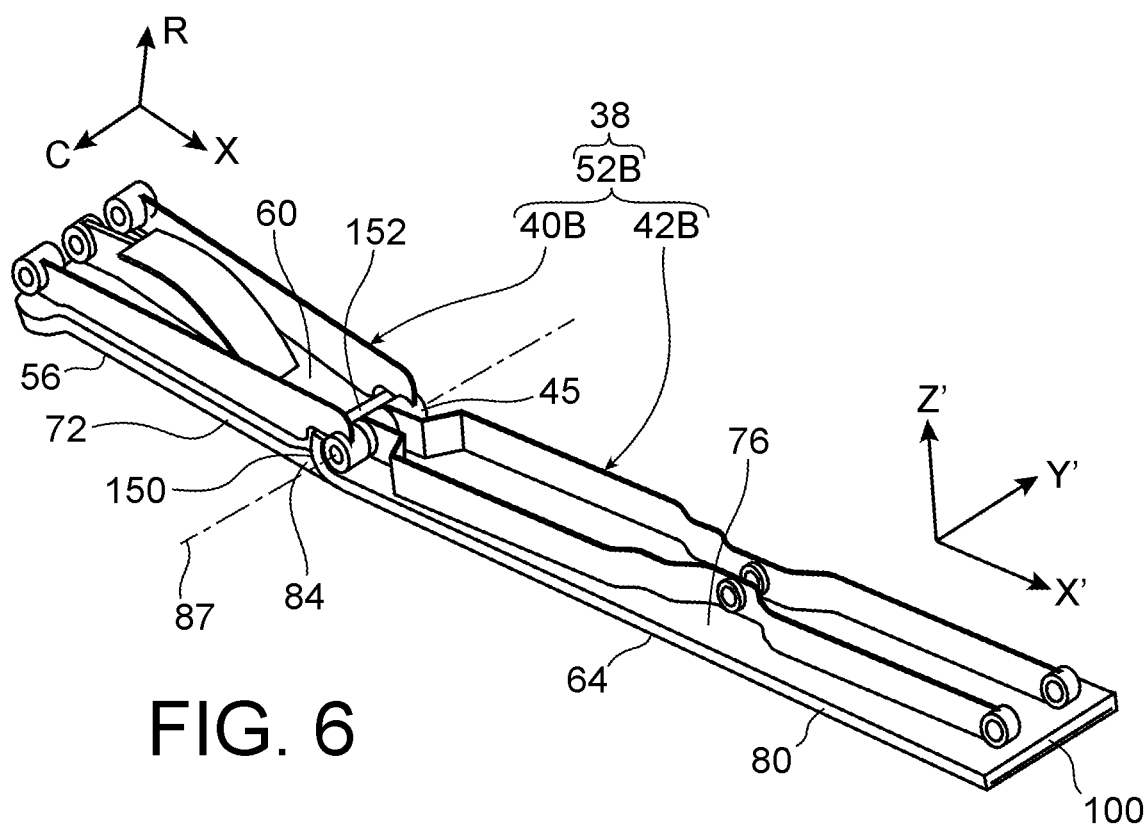
FIG. 6 is a partial schematic perspective view of a convergent-divergent flap pair according to a preferred embodiment of the invention, which is part of the nozzle of the variable-geometry convergent-divergent type of FIG. 4.
Figure 7:
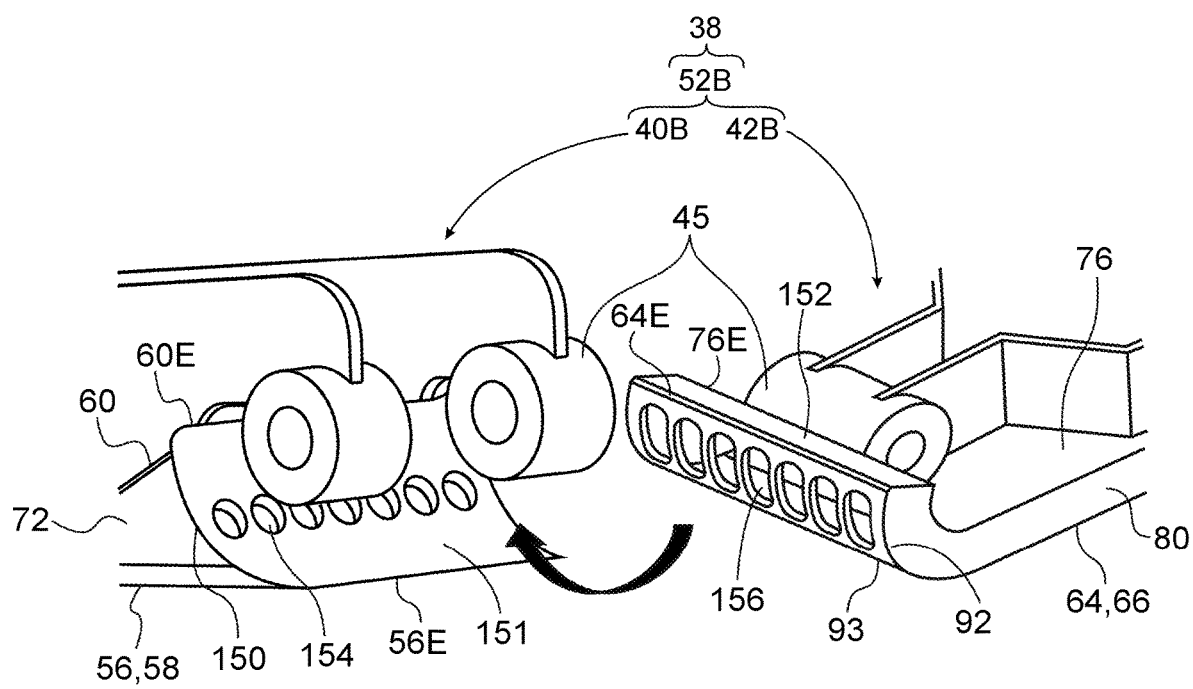
FIG. 7 is a partial schematic perspective view of the convergent-divergent flap pair of FIG. 6, in a disassembled state.

The convergent flap 40B further includes two opposite respective lateral end walls 72 each connecting the inner wall 56 of this flap to the outer wall 60 of this flap (FIGS. 6 and 7).

Thus, the convergent flap 40B includes a respective cooling air circulation duct 70 (FIGS. 4, 5A-5B, 7) defined between the inner wall 56 and the outer wall 60 of the flap 40B, and between the two lateral end walls 72 of this flap.

The cooling air circulation duct 70 of the convergent flap 40B includes, at its upstream end, a tip 73 (FIG. 4) configured to be connected to the cooling plenum 36 surrounding the reheat channel 26 (FIG. 2), so that the cooling air circulation duct 70 receives a part of the flow of cooling air CF1, during operation.

Figure 5A:
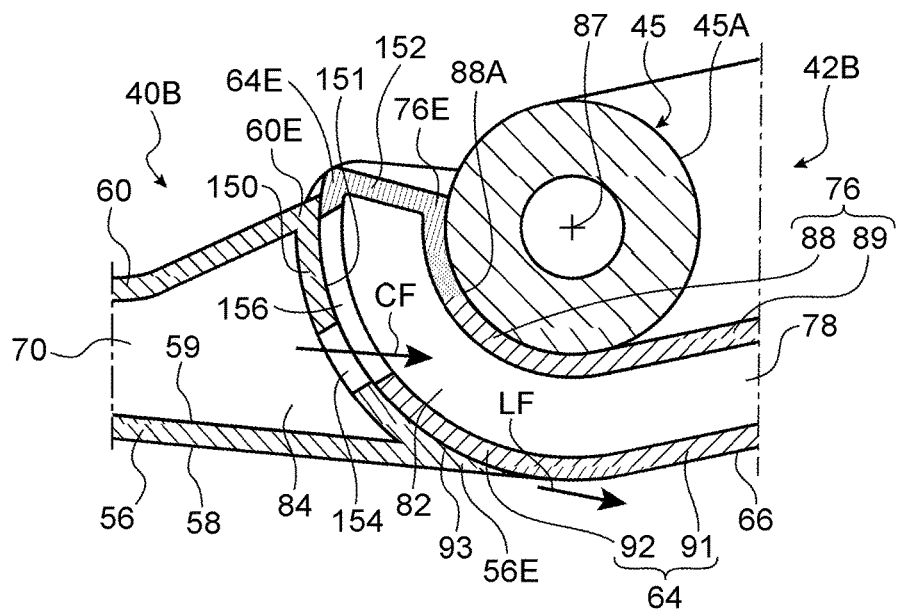
FIG. 5A is a view on a larger scale of a part of FIG. 4.
Figure 5B:
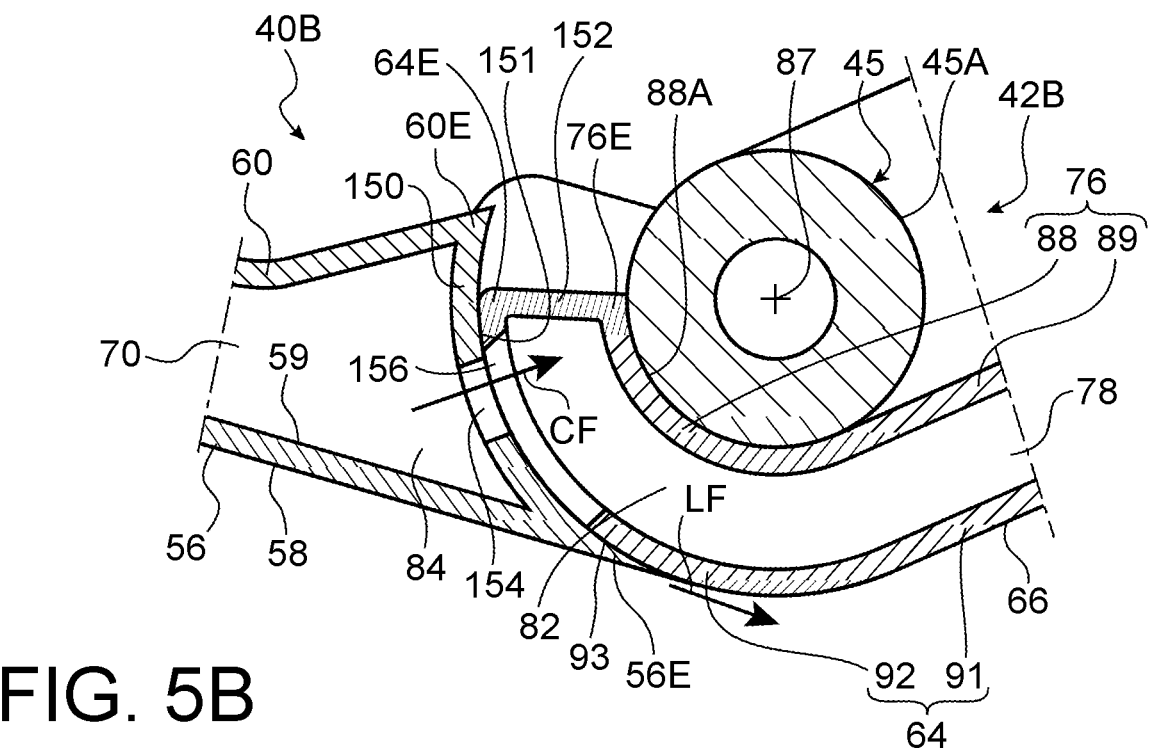
FIG. 5B is a view similar to FIG. 5A, illustrating the convergent-divergent flap pair in a second configuration.

Moreover, the cooling air circulation duct 70 is thus defined in particular by the outer surface 59 of the inner wall 56 of the flap (FIGS. 4, 5A-5B). This latter wall is thus cooled by air circulating in the cooling air circulation duct 70, during operation.

In a manner analogous to that which is described above, the divergent flap 42B includes a respective wall for channelling combustion gas, called inner wall 64 below, extending according to a respective longitudinal direction of the flap, and having, on a radially inner side, a respective inner surface for channelling combustion gas 66 and, on a radially outer side, a respective outer surface 67.

To facilitate the present description, an orthonormal reference frame X', Y', Z' is defined so that the direction X' corresponds to the longitudinal direction of the divergent flap 42B, and thus in particular of the inner wall 64 of the latter, and the direction Y' corresponds to a transverse direction of the divergent flap, and the direction Z' corresponds to the direction of the thickness of the divergent flap.

Unlike the above, the divergent flap 42B further includes a respective outer wall 76 extending opposite the outer surface 67 of the inner wall 64 of this flap, for example in parallel to the inner wall 64, so that these two walls 64 and 76 define between them a respective cooling air circulation duct 78 of the divergent flap 42B (FIGS. 4, 5A-5B, 7).

The divergent flap 42B further includes two respective lateral end walls 80 each connecting the inner wall 64 to the outer wall 76 of the divergent flap (FIGS. 6 and 7), so that the two lateral end walls 80 laterally close (and thus define between them) the cooling air circulation duct 78 of the divergent flap 42B.

The cooling air circulation duct 78 of the divergent flap 42B is connected to the cooling air circulation duct 70 of the convergent flap 40B (FIGS. 5A, 5B). The cooling air circulation duct 78 of the divergent flap 42B thus receives the flow of cooling air coming from the cooling air circulation duct 70 of the convergent flap 40B, or at least the majority thereof, during operation.

In particular, the convergent flap 40B includes a respective closing wall 150 connecting a downstream end 56E of the inner wall 56 of the flap to a downstream end 60E of the outer wall 60 of the flap, so that the closing wall 150 defines a downstream end portion 84 of the cooling air circulation duct 70 of the convergent flap 40B.

The closing wall 150 is shaped in such a way as to have, on the side outside the cooling air circulation duct 70 of the convergent flap 40B, a convergent-flap contact surface 151 in the shape of a portion of a cylinder of revolution having an axis that coincides with a pivot axis 87 about which the divergent flap 42B pivots with respect to the convergent flap 40B when the follower convergent-divergent flap pair 52B goes from one to the other of the first and second extreme angular configurations. In other words, the pivot axis 87 forms the axis of curvature of the convergent-flap contact surface 151, the latter being concave when viewed from the pivot axis 87.

In the example illustrated, the closing wall 150 is itself in the shape of a cylinder portion, and thus also has a surface having a similar shape on the side of the inside of the cooling air circulation duct 70.

Moreover, the inner wall 56 of the convergent flap 40B has a flat shape until the downstream end 56E of this wall.

The inner wall 64 of the divergent flap 42B includes a respective main portion 91, for example having a flat shape, and an upstream end portion 92 curved in such a way as to have, on the side outside the cooling air circulation duct 78 of the divergent flap 42B, a divergent-flap contact surface 93 in the shape of a portion of a cylinder of revolution having an axis coinciding with the pivot axis 87.

In the example illustrated, the upstream end portion 92 is itself in the shape of a cylinder portion, and thus also has a surface having a similar shape on the side of the inside of the cooling air circulation duct 78.

In an analogous manner, the outer wall 76 of the divergent flap 42B includes a respective main portion 89, for example having a flat shape, and an upstream end portion 88 curved in such a way as to have, on the side outside the cooling air circulation duct 78 of the divergent flap 42B, an outer surface 88A in the shape of a portion of a cylinder of revolution having an axis coinciding with the pivot axis 87.

In the example illustrated, the upstream end portion 88 is itself in the shape of a cylinder portion, and thus also has a surface having a similar shape on the side of the inside of the cooling air circulation duct 78.

The cooling air circulation duct 78 of the divergent flap 42B thus has a curved upstream end portion 82, the axis of curvature of which is the pivot axis 87.

The divergent flap 42B further includes a respective closing wall 152 that connects an upstream end 64E of the inner wall 64 of this flap to an upstream end 76E of the outer wall 76 of this flap, and which thus defines the upstream end portion 82 of the duct 78.

The upstream end portion 82 of the duct 78 is thus curved towards upstream and radially towards the outside.

The upstream end portion 82 of the cooling air circulation duct 78 is interposed between the hinge 45 and the closing wall 150 of the convergent flap 40B. More generally, the duct 78 is thus interposed between the pivot axis 87 and the convergent-flap contact surface 151.

For example, the outer surface 88A of the upstream end portion 88 of the outer wall 76 of the divergent flap 42B is applied onto an outer surface 45A of the hinge 45 having a cylindrical shape of revolution centred on the pivot axis 87, so that the upstream end portion 88 skirts the hinge 45.

According to a particularity of the invention, the divergent-flap contact surface 93 is thus arranged directly opposite the convergent-flap contact surface 151, so that the divergent-flap contact surface 93 slides along the convergent-flap contact surface 151 when the divergent flap 42B pivots with respect to the convergent flap 40B around the pivot axis 87.

For this purpose, it is remarkable that the convergent-flap contact surface 151 and the divergent-flap contact surface 93 have similar shapes.

Moreover, the convergent-flap contact surface 151 is provided with first air passage openings 154 opening into the cooling air circulation duct 70 of the convergent flap 40B. The divergent-flap contact surface 93 is provided with second air passage openings 156 opening into the cooling air circulation duct 78 of the divergent flap 42B.

The first air passage openings 154 and the second air passage openings 156 are shaped and positioned so that the first air passage openings 154 are arranged directly opposite the second air passage openings 156, respectively, and thus place the cooling air circulation duct 70 of the convergent flap 40B in communication with the cooling air circulation duct 78 of the divergent flap 42B, regardless of the angular configuration adopted by the convergent-divergent flap pair 52B.

For this purpose, the first air passage openings 154 have for example a circular cross-section, while the second air passage openings 156 have for example a cross-section elongated according to respective planes comprising the longitudinal direction X' of the divergent flap 42B.

The modes of connection of the ducts 70 and 78 described above can be inverted, between each of the ducts, without going beyond the context of the invention. This should be understood as meaning that the duct 70 of the convergent flap 40B can include a downstream end portion curved towards downstream and radially towards the outside corresponding to an inverted configuration of the upstream end portion 82 of the duct 78 described above, while the divergent flap 42B includes a closing wall having a complementary shape, corresponding to an inverted configuration of the closing wall 150 of the convergent flap 40B described above.

Nevertheless, a particular advantage of the example described above lies in the fact that the orientation of the contact surfaces 93 and 151 allows for possible leaks of air LF between the cooling air circulation duct 70 of the convergent flap 40B and the cooling air circulation duct 78 of the divergent flap 42B to open into the duct for circulation of combustion gas 39 in the direction of the flow of the flow of gas F4. The head losses induced by the possible leaks of air LF are thus minimised. Moreover, these possible leaks of air LF can thus form a cooling film along the surface for channelling combustion gas 66 of the divergent flap 42B, and thus contribute to the cooling of the divergent flap 42B.

Moreover, the divergent flap 42B includes a respective downstream end wall 100 (FIGS. 4 and 6) arranged at a downstream end of the cooling air circulation duct 78 of the divergent flap 42B, and creating at least one opening 110 by which this duct opens downstream. This should be understood as meaning that at least one such opening is formed in the downstream end wall 100 and/or that at least one such opening is adjacent to the downstream end wall 100, that is to say arranged between an edge of the downstream end wall 100 and one out of the inner wall 64, the outer wall 76, and the lateral end walls 80. The downstream end wall 100 thus connects to each other at least some out of the inner wall 64, the outer wall 76, and the lateral end walls 80.

Such an opening 110 allows the exhaust of the flow of cooling air CF1 out of the cooling air circulation duct 78 of the divergent flap 42B downstream, during operation.

The cooling air circulation duct 78 of the divergent flap 42B advantageously extends until the downstream end of the inner wall 64 of this flap, so that the entirety of this wall is cooled by the flow of cooling air CF1 during operation.

Moreover, the nozzle 28 advantageously includes a space for air outlet 120 arranged between a downstream end of the mobile divergent flap 42B and a downstream end of the mobile outer flap 68 arranged facing the divergent flap 42B (FIG. 4). Such a space for air outlet 120 allows the exhaust of air coming from possible leaks LF2 between circumferentially adjacent mobile inner flaps, and/or of air TA coming from an exterior plenum, routinely called "tunnel", surrounding the turbojet engine in the fuselage of an aircraft.

During operation, the flow of gas F4, consisting of the mixture of the combustion gases coming from the primary jet, and of the bypass flow F3, circulates in the reheat channel 26, then exits the turbojet engine 10 through the nozzle 28, as explained above in reference to FIG. 2.

The flow of cooling air CF1 circulates along the outer envelope 32 in the cooling plenum 36 (FIG. 2) then penetrates into the cooling air circulation duct 70 of the convergent flap 40B via the tip 73 of the latter (FIG. 4).

The flow of cooling air CF1 circulates in the cooling air circulation duct 70 until the downstream end portion 84 of the latter, thus cooling the convergent flap 40B, in particular the inner wall 56 of this flap.

Then the flow of cooling air CF1 penetrates into the cooling air circulation duct 78 of the corresponding divergent flap 42B by passing through the first air passage openings 154 then the second air passage openings 156.

The flow of cooling air CF1 circulates in the cooling air circulation duct 78 until the downstream end of the latter, thus cooling the divergent flap 42B, in particular the inner wall 64 of this flap.

Finally, the flow of cooling air CF1 escapes from the cooling air circulation duct 78 through the opening (or each opening) made by the downstream end wall 100.

Moreover, in another embodiment of the invention, the divergent flap does not have a cooling air circulation duct, but does include, however, a duct for ejection of cooling air, having a longitudinal extension limited with respect to that of the wall for channelling combustion gas, and opening opposite the surface for channelling combustion gas of the latter in such a way as to eject the cooling air, coming from the cooling air circulation duct of the convergent flap, along the inner surface for channelling combustion gas of the wall for channelling combustion gas of the divergent flap.

In such a case, the duct for ejection of cooling air is defined between an upstream part of the outer wall of the divergent flap and the inner wall of the divergent flap. The latter forms a wall for guiding the air, while the outer wall of the divergent flap forms, downstream of the duct for ejection of cooling air, the wall for channelling combustion gas of this flap.

In the general terminology of the present invention, the "cooling-air duct" of the divergent flap thus indifferently designates a cooling air circulation duct or a duct for ejection of cooling air.

In embodiments of the invention, the modes of cooling described above with respect to the follower convergent-divergent flap pairs 52B also apply to the controlled convergent-divergent flap pairs 52A.

In other embodiments of the invention, the controlled convergent-divergent flap pairs 52A have different features, and include for example flaps with a simple skin, that is to say not having a duct for channelling a flow of cooling air. The controlled flaps are indeed generally less exposed to the heat of the combustion gases than the follower flaps. For example, in FIG. 3, it is clear that each follower divergent flap 42B has lateral-end parts 42B-L respectively extending in front of respective lateral-end parts 42A-L of the two adjacent controlled divergent flaps 42A, and thus mask these respective lateral end parts of the controlled divergent flaps 42A with respect to the combustion gases. Thus, only a respective median part 42A-M of each controlled divergent flap 42A is directly exposed to the combustion gases.

In general, the invention applies to any type of turbojet engine comprising a nozzle of the variable-geometry convergent-divergent type, and in particular of the type further comprising a reheat channel upstream of said nozzle.

What is claimed is:

1. A convergent-divergent flap pair for a turbojet engine nozzle of the variable-geometry convergent-divergent type, comprising a convergent flap, and a divergent flap mounted pivotably on the convergent flap about a pivot axis, whereby the convergent-divergent flap pair is capable of going from a first extreme angular configuration, in which the convergent flap and the divergent flap make between them a maximum salient angle, to a second extreme angular configuration, in which the convergent flap and the divergent flap make between them a minimum salient angle smaller than the maximum salient angle,
   wherein the convergent flap includes a respective inner wall, having a respective inner surface for channelling combustion gas and a respective outer surface, and a respective outer wall,
   wherein the convergent flap includes a respective cooling air circulation duct defined between the respective outer surface of the respective inner wall of the convergent flap and the respective outer wall of the convergent flap,
   wherein the divergent flap includes a respective inner wall and a respective outer wall, one of which has a respective inner surface for channelling combustion gas,
   wherein the divergent flap includes a respective cooling-air duct defined between the respective outer surface of the respective inner wall of the divergent flap and the respective outer wall of the divergent flap,
   wherein the convergent flap includes a convergent-flap contact surface in the shape of a cylinder portion, an axis of curvature of which is the pivot axis, and provided with first air passage openings opening into the respective cooling air circulation duct of the convergent flap,
   wherein the divergent flap includes a divergent-flap contact surface in the shape of a cylinder portion, an axis of curvature of which is the pivot axis, and provided with second air passage openings opening into the respective cooling-air duct of the divergent flap,
   wherein the divergent-flap contact surface is arranged directly opposite the convergent-flap contact surface, so that the divergent-flap contact surface slides along the convergent-flap contact surface when the divergent flap pivots with respect to the convergent flap,
   wherein the first air passage openings and the second air passage openings are shaped and positioned so that the first air passage openings are arranged directly opposite the second air passage openings, respectively, and thus place in communication the respective cooling air circulation duct of the convergent flap and the respective cooling-air duct of the divergent flap, regardless of the angular configuration adopted by the convergent-divergent flap pair.

2. The convergent-divergent flap pair according to claim 1, wherein a first duct, out of the respective cooling air circulation duct of the convergent flap and the respective cooling-air duct of the divergent flap, is interposed between the pivot axis and a corresponding surface out of the convergent-flap contact surface and the divergent-flap contact surface.

3. The convergent-divergent flap pair according to claim 2, wherein the respective inner wall of the one out of the convergent flap and the divergent flap that includes said first duct has a curved end portion on which said corresponding surface is formed and including those out of the first air passage openings and the second air passage openings which belong to said corresponding surface.

4. The Convergent-divergent flap pair according to claim 2, wherein the one out of the convergent flap and the divergent flap that includes the other duct out of the respective cooling air circulation duct of the convergent flap and the respective cooling-air duct of the divergent flap includes a respective closing wall, on which the other surface, out of the convergent-flap contact surface and the divergent-flap contact surface, is formed, said closing wall including those out of the first air passage openings and the second air passage openings which belong to said other surface, and said closing wall mutually connecting two respective ends of the inner wall and of the outer wall of the flap.

5. The convergent-divergent flap pair according to claim 2, wherein said first duct is the respective cooling-air duct of the divergent flap.

6. The convergent-divergent flap pair according to claim 1, wherein:
   the convergent flap includes two respective lateral end walls each connecting the respective inner wall of the convergent flap to the respective outer wall of the convergent flap, so that the respective cooling air circulation duct of the convergent flap is further defined by the two respective lateral end walls of the convergent flap, and
   the divergent flap includes two respective lateral end walls each connecting the respective inner wall of the divergent flap to the respective outer wall of the divergent flap, so that the respective cooling-air duct of the divergent flap is further defined by the two respective lateral end walls of the divergent flap.

7. The convergent-divergent flap pair according to claim 1, wherein the respective inner wall of the divergent flap is the wall of the divergent flap that has said respective inner surface for channelling combustion gas, and the respective inner wall of the divergent flap further has a respective outer surface, and wherein the respective cooling-air duct of the divergent flap is a respective cooling air circulation duct defined by the respective outer surface of the respective inner wall of the divergent flap.

8. A nozzle of the variable-geometry convergent-divergent type for a turbojet engine, comprising convergent-divergent flap pairs distributed around an axis of the nozzle and at least some of which are convergent-divergent flap pairs according to claim 1, and a channel for circulation of combustion gas defined at least by the respective inner surfaces for channelling combustion gas of the respective inner walls of the respective convergent flaps and of the respective divergent flaps of the convergent-divergent flap pairs.

9. A turbojet engine for an aircraft, comprising a reheat channel surrounded by a cooling plenum separated from the reheat channel by a thermal protection liner, and a nozzle according to claim 8,
   wherein the respective cooling air circulation ducts of the convergent flaps of the convergent-divergent flap pairs of the nozzle are connected to the cooling plenum surrounding the reheat channel.

* * * * *